United States Patent
Arzenton et al.

(10) Patent No.: US 6,929,246 B2
(45) Date of Patent: Aug. 16, 2005

(54) EXPANSION VALVE FITTED WITH A CONNECTOR THAT IS DESIGNED FOR THE CONNECTION OF A USER SOCKET

(75) Inventors: Marco Arzenton, Verona (IT); Etienne Gounot, Paris (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/477,544
(22) PCT Filed: Apr. 19, 2002
(86) PCT No.: PCT/FR02/01360
§ 371 (c)(1), (2), (4) Date: May 28, 2004
(87) PCT Pub. No.: WO02/090813
PCT Pub. Date: Nov. 14, 2002

(65) Prior Publication Data
US 2004/0187935 A1 Sep. 30, 2004

(30) Foreign Application Priority Data
May 10, 2001 (FR) .............................. 01 06173

(51) Int. Cl.[7] .............................. F16L 29/00
(52) U.S. Cl. ................ 251/366; 251/149.6; 137/614.04
(58) Field of Search ............................... 251/366, 149.1, 251/149.6; 137/614.04, 614.03, 614.05, 614

(56) References Cited

U.S. PATENT DOCUMENTS

| 3,127,148 A | * | 3/1964 | Collar ..................... 251/149.2 |
| 5,588,590 A | * | 12/1996 | Sakakibara et al. ......... 137/614 |
| 5,975,121 A | * | 11/1999 | Arzenton et al. ........... 137/377 |
| 6,085,785 A | * | 7/2000 | Smith, III ............... 137/614.04 |

FOREIGN PATENT DOCUMENTS

EP        0 747 796 B1    6/1996

* cited by examiner

Primary Examiner—Kevin Lee
(74) Attorney, Agent, or Firm—Linda K. Russell

(57) ABSTRACT

A fluid expansion valve with a main body and a method of its use. The main body has an internal fluid passage and an outlet connector. The outlet connector is suitable for delivering the expanded fluid and for connecting with a socket. The internal profile of the socket is suited for connection with the external profile of the outlet connect. The outlet connect has three connention sections of varying external diameters. The valve may be used to introduce a pressurized gas to a liquid or a beverage.

27 Claims, 3 Drawing Sheets

_US 6,929,246 B2_

EXPANSION VALVE FITTED WITH A CONNECTOR THAT IS DESIGNED FOR THE CONNECTION OF A USER SOCKET

BACKGROUND OF THE INVENTION

1. Field of the Invention

The invention relates to an expansion valve the gas outlet coupling of which comprises an external profile suited to taking a user connector with a complementary internal profile, preferably a expansion valve with a non-adjustable reduced pressure for gas cylinders, particularly those which may be used in the field of food, particularly for drinks, in the field of welding, in laboratories or the like.

2. Related Art

Existing gas valve assemblies with built-in pressure reducers, also known as expansion valves, like the one described in document EP-A-0747796, usually have at least one device for interrupting the delivery of high-pressure gas, a pressure reducer, a system for adjusting the pressure and the flowrate, and a coupling for the gas outlet and to which the user can connect.

The device for interrupting the delivery of high-pressure gas is composed mainly either of the valve shutter of the pressure reducer when the expansion valve assembly has just one shutter, or of a shutter separate from the pressure-reducing shutter, when the expansion valve assembly has several valve shutters, generally two shutters.

When the operator wishes to obtain gas, he has therefore to perform two or even three successive operations, namely to connect a gas outlet coupling to the body of the expansion valve assembly, to open the gas passage by operating a valve or a control lever on the gas outlet, and possibly to adjust the flowrate and/or the pressure of the gas to the desired value.

Now, in a certain number of uses or applications, these successive operations on the part of the user on the expansion valve assembly may give rise to:

a risk of error leading to malfunctioning, particularly on the part of users who have little or no technical awareness, which is, in particular, the case in the application to the tapping off of $CO_2$, because the users of $CO_2$ in packaged form are, in particular, proprietors or managers concerned with delivering drinks, such as beer or other sparkling beverages which are served on tap in this type of establishment, particularly fizzy drinks, and a significant length of time spent using the gas, which may sometimes prove to take quite a long time until the desired result is obtained.

In an attempt at solving this problem, an expansion valve which is simpler to use than the conventional expansion valves, even for users with no particular technical awareness as it has a reduced number of operations that need to be performed when the user taps off gas, has already been proposed and this valve being characterized by the presence of a gas outlet coupling which can take a user connector and which delivers reduced-pressure gas at a reduced pressure that the user cannot adjust, that is to say at a predetermined fixed pressure of, for example, 8 bar.

Now, at the present time, gas outlet couplings of this type of expansion valve are all practically identical or differ from one another only very slightly, which means that there may be a significant risk of error, when the user connection is being connected or coupled to the said coupling by an ill-informed operator.

SUMMARY OF THE INVENTION

The purpose of the present invention is therefore to solve the above problem by proposing an improved expansion valve.

The solution to this problem therefore consists in a fluid expansion valve preferably with a preset reduced pressure comprising:

a main body within which there is formed at least one internal passage for fluid between at least one inlet port for fluid whose pressure is to be reduced, and at least one outlet port for reduced-pressure fluid, fluid pressure-reducing means arranged in or on at least part of the said internal fluid passage, between the said inlet port and the said outlet port, and designed to reduce the pressure of the fluid, and an outlet coupling able to deliver the said reduced-pressure fluid, the internal fluid passage opening to the outlet end of the said reduced-pressure fluid outlet coupling and the said outlet coupling comprising an external profile designed to take and have connected to it a user connector which has an internal profile tailored to and/or complementing the said external profile of the said coupling, characterized in that the outlet coupling comprises at least three cylindrical coupling portions arranged in succession from the outlet end of the said outlet coupling towards the end via which the said outlet coupling is coupled to the body of the expansion valve, the first coupling portion P1 having a first outside diameter D1, the second coupling portion P2 having a second outside diameter D2 and the third coupling portion P3 having a third outside diameter D3, which diameters are such that D1<D2<D3 and D1 is between 6 mm and 10 mm, D2 is between 7 mm and 18 mm and D3 is between 11 mm and 19 mm.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
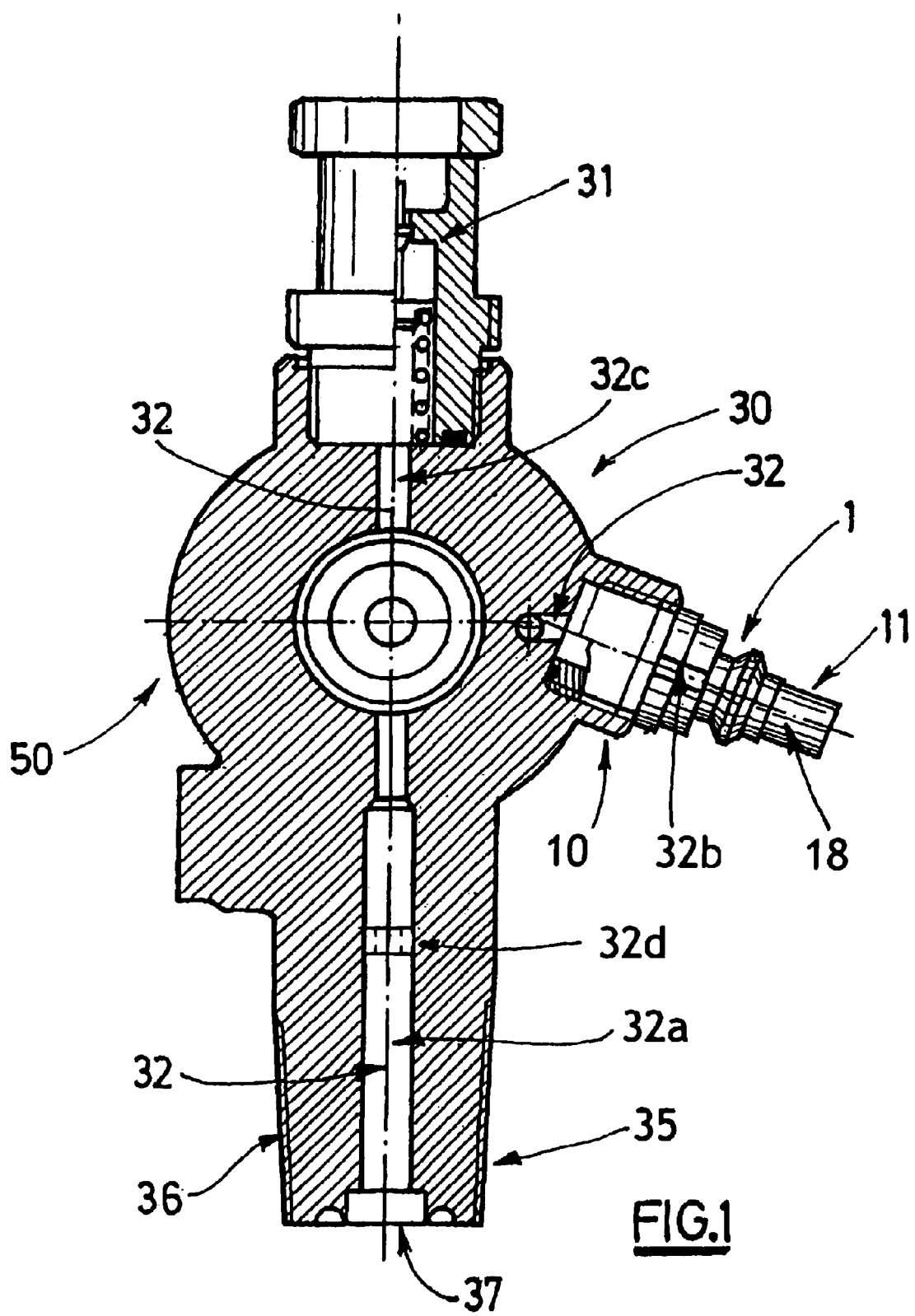
FIG. 1 illustrates a view in longitudinal section of an expansion valve in accordance with one illustrative embodiment of the present invention.

As appropriate, the expansion valve of the invention may have one or more of the following features:

the outlet coupling furthermore comprises a fourth cylindrical coupling portion P4 having a fourth outside diameter D4, situated between the third portion P3 of outside diameter D3 and the end via which the outlet coupling is coupled to the body of the expansion valve, with D3<D4 and D4 between 12 mm and 21 mm; the end via which the outlet coupling is coupled to the body of the expansion valve being the end of the coupling via which the said coupling is fixed or secured to the body of the expansion valve, the outlet coupling further comprises a fifth cylindrical portion P5 of fifth outside diameter D5 situated between the fourth portion P4 of outside diameter D4 and the end via which the said outlet coupling is coupled to the body of the expansion valve, with D5>D4 and D5 between 15 mm and 27 mm, the outlet coupling further comprises a sixth cylindrical portion P6 of outside diameter D6 situated between the third portion P3 of outside diameter D3 and the fourth portion P4 of outside diameter D4, with D3>D6 and D6 between 7 mm and 18 mm, preferably between 8 mm and 17 mm, D1 is between 7 mm and 9 mm, D2 is between 8 mm and 17 mm, D3 is between 12 mm and 18 mm, D4 is between 13 mm and 20 mm, D5 is between 16 mm<D5<26 mm and/or D6 is between 8 and 12 mm, the first coupling portion P1 has an external length L1 of between 6 mm and 9 mm, preferably between 7 mm and 8.5 mm, the second coupling portion P2 has an external length L2 of between 1.5 mm and 4 mm, preferably between 2 mm and 3.5 mm, the third coupling portion P3 has an external length L3 of between 0.5 and 3 mm, preferably of the order of 1.2 mm, the fourth coupling portion P4 has an external length L4 of between 2 mm and 6 mm and/or preferably of the order of 3.5 mm, the fifth coupling portion P5 has an external length L5 of between 2 mm and 6 mm, preferably of the order of 3.5 mm, the sixth coupling portion P6 has an external length L6 of between 2.5 mm and 5 mm, preferably 3 and 4.5 mm, the second coupling portion P2 and the third coupling portion P3 are separated by a ramp and/or the first coupling portion P1 has a chamfer at the outlet end of the outlet coupling, the outlet coupling comprises at least one coupling valve shutter able to move in translation in the outlet coupling when a user outlet connector comprising means of actuating the valve shutter which collaborate with the said valve shutter so as to move the shutter is connected to the said coupling, the fluid pressure-reducing means comprise a pressure-reducing valve shutter positioned in a fixed pressure-reducing position that cannot be altered by the user and that corresponds to the said preset pressure value, the fluid pressure-reducing means allow the fluid to have its pressure reduced to a preset pressure value of between 4 bar and 12 bar, more preferably still of between 5 bar and 10 bar, the coupling valve shutter moves in translation in the outlet coupling when a user outlet connector comprising means of actuating the coupling valve shutter which collaborate with the said valve shutter so as to obtain the said movement is connected to the said coupling, the outlet coupling has a profile tailored to collaborate with a guiding and locking system formed in a user outlet connector with a complementary profile, the outlet coupling comprises a valve shutter spring means collaborating with the coupling shutter and at least one seal and a bearing surface making it possible to obtain sealing against fluid of the fluid outlet port borne by the coupling.

According to another aspect, the invention relates also to a system for transferring fluid comprising a gas expansion valve according to the invention, and a gas outlet connector having an internal profile which complements the external profile of the said outlet coupling and comprising a body in which there is formed an internal guidance and locking system used to receive and guide the end of the outlet coupling of the expansion valve and, also, to prevent the connector from becoming disconnected from the said coupling by collaborating with the external profile of the external peripheral wall of the coupling, the said connector also comprising a connector valve shutter which normally rests against a valve seat and can be moved in translation along the longitudinal axis of the connector.

The invention also relates to a container of pressurized fluid, particularly a gas cylinder, equipped with a expansion valve according to the invention, preferably the said assembly is inserted in and protected by a protective bonnet mounted on the container.

The present invention will now be better understood by virtue of the detailed description which follows, given with reference to the appended figures.

FIG. 1 depicts a view in longitudinal section of a expansion valve 50 according to the invention the body 30 of which contains a part which acts as a pressure reducer. The level of pressure reduction is either preset to a given pressure that the user cannot alter, for example 8 bar, or is adjustable by the user according to the level of pressure required in the application in question.

Setting the pressure to its desired fixed value is performed in a way known per se and will not be detailed hereinbelow.

According to the invention, the body 30 also comprises a gas-outlet coupling 1 with shut-off allowing easy and quick connection and disconnection of an outlet connector to this expansion valve 50 so that the gas reduced to the said reduced pressure downstream of the pressure reducer can be collected and then used.

The opening for the gas passing through the body 30 of the expansion valve assembly 50 is controlled downstream of the pressure-reducing part and is synchronized with the connection of the gas outlet connector (see FIG. 3) by the user to the gas outlet coupling 1.

Connecting this gas tapping or outlet connector to the gas outlet coupling 1 makes it possible, apart from the actual connection proper, to achieve sealing followed by a release of gas at the desired pressure.

Furthermore, a gas cylinder equipped with this type of expansion valve 50 can be filled without removing the assembly and this can be done simply by supplying the filling valve 31 with gas under pressure (high pressure) which then passes through the body 30 via the internal passage 32, 32c, 32a connecting the said filling valve 31 to the connection fitting 35 that allows the expansion valve 50 to be fixed to the neck of a gas cylinder. The internal gas passage 32, 32c passes axially through the connecting fitting 35 which carries an external screw thread 36.

In fact, the passage 32 here comprises three portions 32a, 32b and 32c. The portions 32c and 32a of the internal passage 32 connect, as explained hereinabove, the filling valve 31 to the connection fitting 35 and therefore to the inside of the cylinder, and are used when filling with high-pressure gas, while the passages 32a and 32b connect the inside of the cylinder, via the fitting 35, to the outlet port 18 borne by the outlet coupling 1 of the invention so as to allow the user to be supplied with low-pressure gas, that is to say gas at a pressure which has been reduced by comparison with the pressure of the gas in the container bearing the expansion valve 50.

By virtue of this type of expansion valve, use of the gas at low pressure is reduced to a single operation which is simple and quick.

If the user connector, supplying the user's gas circuit, is also of the type with shut-off, the use of a expansion valve according to the invention also preserves the quality of the gas.

Figure 2:
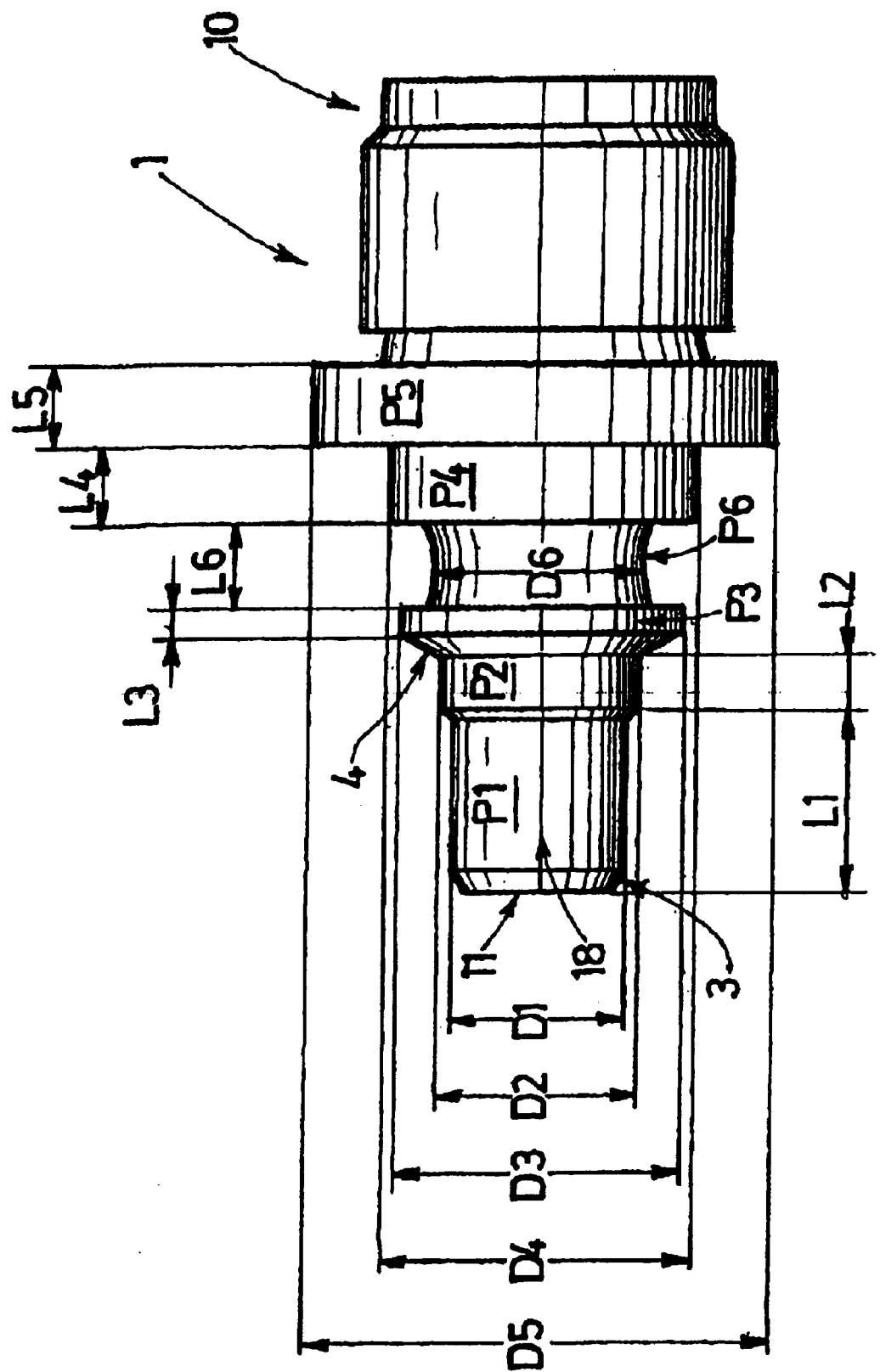
FIG. 2 illustrates a view in longitudinal side view of an outlet coupling for an expansion valve in accordance with one illustrative embodiment of the present invention.
Figure 3:
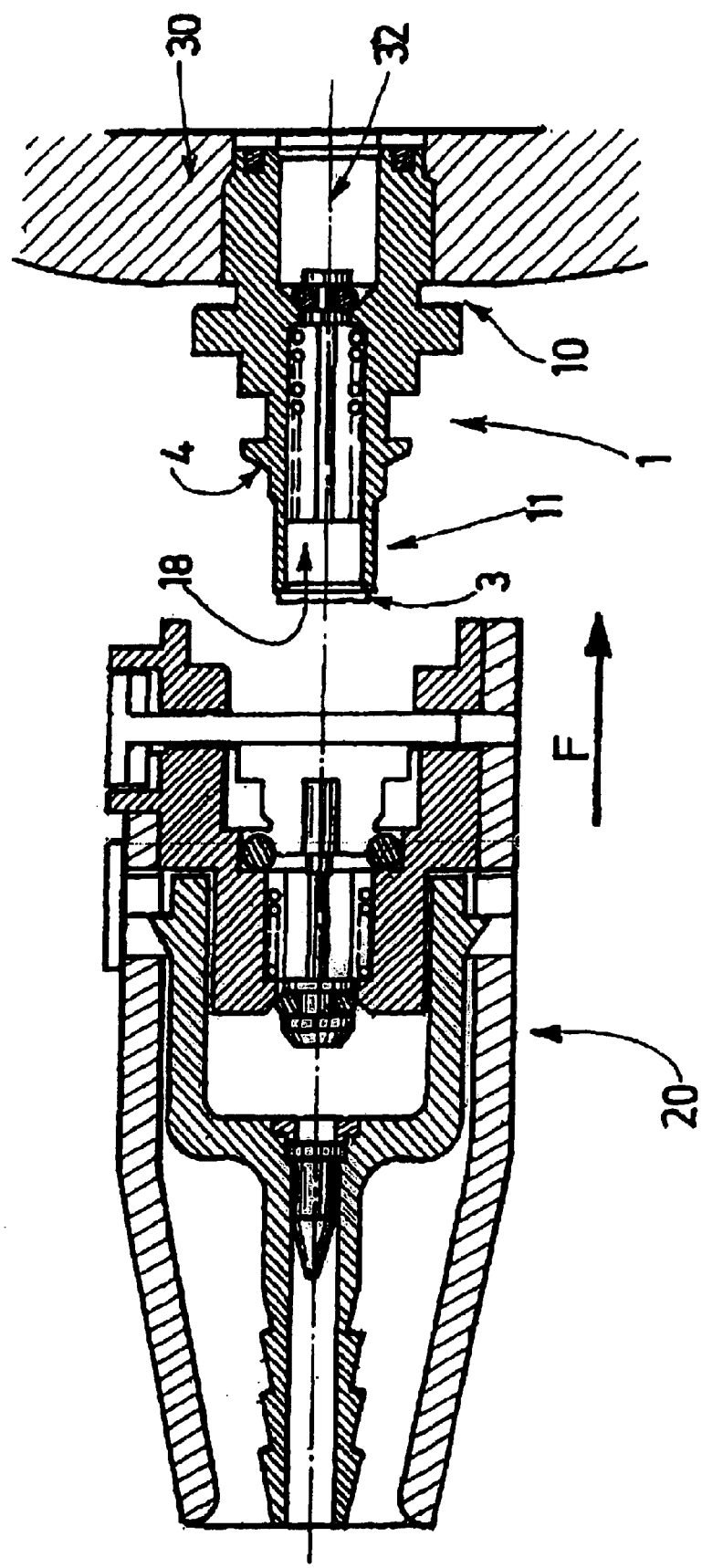
FIG. 3 illustrates a view of the user outlet connector and the outlet coupling in accordance with one illustrative embodiment of the present invention.

FIG. 2 depicts a longitudinal side view of an outlet coupling 1 for a expansion valve 50 according to the invention, to which can be connected and fixed a user connector 20 which can adopt various forms of embodiment, such as a connector 20 with a fixing ring or collar or, as the case may be, with a control button as illustrated in FIG. 3.

The gas expansion valve further comprises, as detailed in FIGS. 1 and 2, a main body 30 within which there is formed the internal gas passage 32 between an inlet port 37 for the gas that is to be reduced in pressure, for example the gas at a high pressure of 100 bar, carried by the fitting 35, and an outlet port 18 for gas reduced to the desired pressure, for example a fixed pressure of 8 bar. Pressure reduction is performed by conventional fluid pressure reducing means 32d arranged in the path of the gas, in or on part of the said internal gas passage 32 between the inlet port 37 and the outlet port 18. Gas is distributed to the user via the gas outlet coupling 1 according to the invention which is able to deliver the reduced-pressure gas, that is to say the gas after pressure reduction by the said pressure-reducing means which in particular comprise a expansion valve shutter, a pressure-reducing port and a valve seat all collaborating with one another in a known way to reduce the pressure of the high-pressure gas.

The internal gas passage 32 opens (at 32b) at the outlet end 11 of this reduced-pressure fluid outlet coupling 1 and also comprises an external profile suited to receiving and to having connected to it a user connector 20 which has an internal profile tailored to and/or complementing the said external profile of the said coupling.

To solve the problem of the invention, the outlet coupling 1 comprises several cylindrical coupling portions P1 to P6, arranged so they are successive from the outlet end 11 of the outlet coupling 1 towards the end 10 via which the latter is coupled to the body of the expansion valve. The respective coupling portions P1 to P6 each have a respective outside diameter D1 to D6 as defined above.

By way of example, the dimensions (in mm) of the various diameters D1 to D6 of couplings 1 of several expansion valves according to the invention are given in Table I below.

TABLE I

| | Diameters | | | | | |
|---|---|---|---|---|---|---|
| | D1 | D2 | D3 | D4 | D5 | D6 |
| Example 1 | 8 | 9 | 13 | 14 | 21 | 9.5 |
| Example 2 | 8 | 12 | 13 | 14 | 17 | 9.5 |
| Example 3 | 8 | 9 | 13 | 15 | 20 | 9.5 |
| Example 4 | 8 | 10 | 13 | 15 | 19 | 9.5 |
| Example 5 | 8 | 11 | 13 | 14 | 18 | 9.5 |
| Example 6 | 8 | 13 | 17 | 18 | 25 | 9.5 |
| Example 7 | 8 | 16 | 17 | 18 | 21 | 9.5 |
| Example 8 | 8 | 13 | 17 | 19 | 24 | 9.5 |
| Example 9 | 8 | 14 | 17 | 19 | 23 | 9.5 |
| Example 10 | 8 | 15 | 17 | 18 | 22 | 9.5 |

Furthermore, the lengths L1 to L6 of the various portions P1 to P6 in examples 1 to 10 above were as given in Table II below.

TABLE II

| Lengths of portions P1 to P6 (in mm) | | | | | |
|---|---|---|---|---|---|
| L1 | L2 | L3 | L4 | L5 | L6 |
| 7.75 | 2.75 | 1.2 | 3.5 | 3.5 | 3.8 |

In FIG. 3 it can be seen that when the user connector 20 is connected (direction of the arrow F) to the coupling 1, the internal part of the said connector 20 fits over the external profile of the outlet coupling 1.

More specifically, the user connector 20 has a fixing end which comprises an internal housing the profile of which is tailored to and complements that of the coupling 1 and which is intended to receive the projecting end of the coupling 1.

The fact of giving the coupling 1 several diameters D1 to D5 which differ and which increase, from the outlet end 11, makes it possible not only to facilitate the connecting of the connector to the coupling but also to avoid any risk of significant error when an ill-informed operator is connecting or coupling the user connector to the said coupling, because a connector with a profile not specific to that of the coupling will not be able to be coupled to it.

Furthermore, in order to make connection even quicker and more effective the connector 20 also comprises an internal guiding and locking system used, on the one hand, to receive and to guide the end 11 of the coupling 1 and, on the other hand, to prevent the connector 20 from becoming disconnected from the coupling 1, after coupling, by collaborating with the portions P3 and P6 of the coupling, which portions are situated peripherally on the cylindrical coupling 1 and respectively constitute a projecting annular part (P3) and a recessed annular portion forming a groove (P6).

Furthermore, the user connector 20 comprises a conventional system for controlling the passage of fluid from the coupling to the connector 20, which system in particular comprises a connector valve shutter equipped with a projecting portion which normally rests against a valve seat so as to shut off the fluid passage of the connector by means of the projecting portion borne by the valve shutter. An elastic means, such as a spring, exerts a thrusting force on the rear part of the shutter tending to push it back towards its seat. Conversely, when the valve shutter is lifted off its seat, fluid can flow into the connector 20 from its inlet end, through the fluid passage from which the projecting portion of the valve is now extracted, and is discharged via the central passage of the connector 20. An appropriate seal provides sealing between the coupling 1 and the connector 20 when these are connected to one another.

Furthermore the coupling 1 for its part comprises a coupling shutter and a shutter spring, and a seal, which seals the fluid outlet port, at a bearing surface.

The positioning of the connector 20 on the coupling 1 and the errorproofing associated with the specific profile of the assembly are achieved by pushing the user connector 20 in a translational movement over the outlet coupling 1 of the expansion valve. Sealing is obtained gradually by continuing to insert the connector 20 over the cylindrical outlet end of the coupling 1. When sealing has been achieved, the shutters in the connector and in the coupling respectively gradually open, these collaborating with one another by pushing each other back in synchronism or, as the case may be, successively one after the other. Furthermore, the locking system plays its part so as to allow the connector 20 to be fixed securely to the coupling 1. After that, as the shutters are lifted off their respective seats, the cycle of reducing the pressure to the desired pressure can begin and the reduced-pressure gas then passes to the user connector 20 and is then conveyed, via appropriate means, particularly pipes, hoses or the like, to the gas user site. Conversely, disconnection can be achieved by performing the opposite.

The expansion valve of the invention is particularly well suited to delivering a gas under pressure intended to pressurize a drink, particularly beer or a fizzy drink.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A fluid expansion valve comprising:
   a) a main body within which there is formed at least one internal passage for fluid, said internal passage having at least one inlet port for fluid whose pressure is to be reduced, and at least one outlet port for reduced-pressure fluid,
   b) fluid pressure-reducing means arranged in or on at least part of said internal fluid passage, between said inlet port and said outlet port, and designed to reduce the pressure of the fluid, and
   c) an outlet coupling having at least one inlet end and at least one outlet end, with said outlet end comprising an external profile designed to take and have connected to it a user connector which has an internal profile tailored to and optionally, complementing said external profile of said outlet coupling outlet end,
   d) wherein said outlet coupling outlet end comprises at least three cylindrical coupling portions arranged in succession from said outlet end of said outlet coupling towards said inlet end through which said outlet coupling is coupled to said main body,
   said first coupling portion having an first outside diameter,
   said second coupling portion having a second outside diameter, and
   said third coupling portion having a third outside diameter, which diameters are such that
   said first outside diameter is smaller than said second outside diameter, and
   said second outside diameter is smaller than said third outside diameter, and
   said first outside diameter is between about 6 mm and about 10 mm,
   said second outside diameter is between about 7 mm and about 18 mm, and
   said third outside diameter is between about 11 mm and about 19 mm.

2. A fluid expansion valve according to claim 1, wherein said outlet coupling is further comprised of:
   a fourth cylindrical coupling portion having a fourth outside diameter,
   said fourth cylindrical coupling portion being situated between said third coupling portion with said third outside diameter and said inlet end through which said outlet coupling is coupled to said main body, with
   said third outside diameter being smaller than said fourth outside diameter, and
   wherein said fourth outside diameter is between about 12 mm and about 21 mm.

3. An expansion valve according to claim 2, wherein said outlet coupling is further comprised of:
   a fifth cylindrical coupling portion having a fifth outside diameter,
   said fifth cylindrical coupling portion being situated between said fourth coupling portion with said fourth outside diameter and said inlet end through which said outlet coupling is coupled to said main body, with
   said fourth outside diameter being smaller than said fifth outside diameter, and
   wherein said fifth outside diameter is between about 15 mm and about 27 mm.

4. An expansion valve according to claim 2, wherein said outlet coupling is further comprised of:
   a sixth cylindrical coupling portion having a sixth outside diameter,
   said sixth cylindrical coupling portion being situated between said third coupling portion with said third outside diameter and said fourth coupling portion with said fourth outside diameter, with
   said sixth outside diameter being smaller than said third outside diameter, and
   wherein said sixth outside diameter is between about 8 mm and about 17 mm.

5. An expansion valve according to claim 3, wherein said outlet coupling is further comprised of:
   a sixth cylindrical coupling portion having a sixth outside diameter,
   said sixth cylindrical coupling portion being situated between said third coupling portion with said third outside diameter and said fourth coupling portion with said fourth outside diameter, with
   said sixth outside diameter being smaller than said third outside diameter, and
   wherein said sixth outside diameter is between about 8 mm and about 17 mm.

6. An expansion valve according to claim 1, wherein at least one of:
   said first outside diameter is between about 7 mm and about 9 mm,
   said second outside diameter is between about 8 mm and about 17 mm, or
   said third outside diameter is between about 12 mm and about 18 mm.

7. An expansion valve according to claim 2, wherein at least one of:
   said first outside diameter is between about 7 mm and about 9 mm,
   said second outside diameter is between about 8 mm and about 17 mm,
   said third outside diameter is between about 12 mm and about 18 mm, or
   said fourth outside diameter is between about 13 mm and about 20 mm.

8. An expansion valve according to claim 3, wherein at least one of:
   said first outside diameter is between about 7 mm and about 9 mm,
   said second outside diameter is between about 8 mm and about 17 mm,
   said third outside diameter is between about 12 mm and about 18 mm, said fourth outside diameter is between about 13 mm and about 20 mm, or said fifth outside diameter is between about 16 mm and about 26 mm.

9. An expansion valve according to claim 4, wherein at least one of:

said first outside diameter is between about 7 mm and about 9 mm, said second outside diameter is between about 8 mm and about 17 mm, said third outside diameter is between about 12 mm and about 18 mm, said fourth outside diameter is between about 13 mm and about 20 mm or said sixth outside diameter is between about 8 and about 12 mm.

10. An expansion valve according to claim 5, wherein at least one of:

said first outside diameter is between about 7 mm and about 9 mm, said second outside diameter is between about 8 mm and about 17 mm, said third outside diameter is between about 12 mm and about 18 mm, said fourth outside diameter is between about 13 mm and about 20 mm, said fifth outside diameter is between about 16 mm and about 26 mm or said sixth outside diameter is between about 8 and about 12 mm.

11. An expansion valve according to claim 1, wherein said second coupling portion and said third coupling portion are separated by a ramp.

12. An expansion valve according to claim 1, wherein said first coupling portion has a chamfer at said outlet end.

13. An expansion valve according to claim 1, wherein at least one of:

said first coupling portion has an external length of between about 6 mm and about 9 mm, said second coupling portion has an external length of between about 1.5 mm and about 4 mm, or said third coupling portion has an external length of between about 0.5 and about 3 mm.

14. An expansion valve according to claim 5, wherein at least one of:

said first coupling portion has an external length of between about 6 mm and about 9 mm, said second coupling portion has an external length of between about 1.5 mm and about 4 mm, said third coupling portion has an external length of between about 0.5 mm and about 3 mm, said fourth coupling portion has an external length of between about 2 mm and about 6 mm, said fifth coupling portion has an external length of between about 2 mm and about 6 mm, or, said sixth coupling portion has an external length of between about 2.5 mm and about 5 mm.

15. An expansion valve according to claim to 13, wherein said second coupling portion and said third coupling portion are separated by a ramp.

16. An expansion valve according to claim 13, wherein said first coupling portion has a chamfer at said outlet end.

17. An expansion valve according to claim 1, wherein at least one of:

said first coupling portion has an external length of between about 7 mm and about 8.5 mm, said second coupling portion has an external length of between about 2 mm and about 3.5 mm, or said third coupling portion has an external length of about 1.2 mm.

18. An expansion valve according to claim 5, wherein at least one of:

said first coupling portion has an external length of between about 7 mm and about 8.5 mm, said second coupling portion has an external length of between about 2 mm and about 3.5 mm, said third coupling portion has an external length of about 1.2 mm, said fourth coupling portion has an external length of about 3.5 mm, said fifth coupling portion has an external length of about 3.5 mm, or, said sixth coupling portion has an external length of between about 3 mm and about 4.5 mm.

19. An expansion valve according to claims 18, wherein said second coupling portion and said third coupling portion are separated by a ramp.

20. An expansion valve according to claim 18, wherein said first coupling portion has a chamfer at said outlet end.

21. An expansion valve according to claim 1, wherein said outlet coupling is comprised of at least one coupling valve shutter comprising means of actuating the valve shutter, said coupling valve shutter being able to move in translation with said outlet coupling when a user outlet connector is connected to the said outlet coupling.

22. An assembly formed of an expansion valve according to claim 1 and of said user outlet connector having an internal profile that complements said external profile of said outlet coupling.

23. A gas cylinder, equipped with an expansion valve according to claim 1, wherein said expansion valve is inserted in a protective bonnet mounted on the cylinder.

24. The method of using an expansion valve according to claim 1, to deliver a gas under pressure intended to pressurize beer or a carbonated beverage.

25. A system for transferring fluid comprising, an expansion valve according to claim 1, wherein said outlet coupling has an external profile, and said user outlet connector having an internal profile which complements said external profile of said outlet coupling and comprising a body in which there is formed an internal guidance and locking system used to receive and guide said outlet end of said expansion valve and, to prevent the user outlet connector from becoming disconnected from the said outlet coupling by collaborating with said external profile of said outlet coupling, said user outlet connector also comprising a connector valve shutter which normally rests against a valve seat and can be moved in translation along the longitudinal axis of the connector.

26. A fluid expansion valve comprising:

a) a main body within which there is formed at least one internal passage for fluid, said internal passage having at least one inlet port for fluid whose pressure is to be reduced, and at least one outlet port for reduced-pressure fluid, b) a fluid pressure-reducing means arranged in or on at least part of said internal fluid passage, between said inlet port and the said outlet port, and designed to reduce the pressure of the fluid, and c) an outlet coupling having at least one inlet end and at least one outlet end, with said outlet comprising an external profile designed to take and have connected to it a user connector which has an internal profile tailored to and optionally, complementing said external profile of said outlet coupling outlet end, wherein said outlet coupling outlet end comprises at least five cylindrical coupling portions arranged in succession from said outlet end of said outlet coupling towards said inlet end through which said outlet coupling is coupled to said main body, where each coupling portion has an associated outside diameter, such that said first coupling portion having a first outside diameter, said second coupling portion having a second outside diameter, said third coupling portion having a third outside diameter, said fourth cylindrical coupling portion have a fourth outside diameter, and said fifth cylindrical coupling portion having a fifth outside diameter, wherein:

1) said first outside diameter is smaller than said second outside diameter;
2) said second outside diameter is smaller than said third outside diameter, and
3) said fifth outside diameter is between about 15 mm and about 27 mm.

27. The expansion valve according to claim 26, wherein said outlet coupling further comprises:

a sixth cylindrical coupling portion having a sixth outside diameter, said sixth cylindrical coupling portion being situated between said third coupling portion with said third outside diameter and said fourth coupling portion with said fourth outside diameter, with said sixth outside diameter being smaller than said third outside diameter.

* * * * *